United States Patent [19]

Niwa et al.

[11] Patent Number: 4,642,339
[45] Date of Patent: Feb. 10, 1987

[54] THIAZOLEAZOPHENYLAMINOETHYL CARBONYLOXY-$C_8$-$C_{10}$-ALKYL COMPOUNDS USEFUL AS DYES FOR POLYESTER FIBERS

[75] Inventors: Toshio Niwa; Kiyoshi Himeno, both of Yokohama; Junji Yoshihara, Sagamihara, all of Japan

[73] Assignee: Research Association of Synthetic Dyestuffs, Tokyo, Japan

[21] Appl. No.: 788,501

[22] Filed: Oct. 18, 1985

Related U.S. Application Data

[63] Continuation of Ser. No. 583,216, Feb. 24, 1984, abandoned.

[30] Foreign Application Priority Data

Mar. 18, 1983 [JP] Japan .................................. 58-45367

[51] Int. Cl.[4] .................. C09B 29/042; C09B 29/085; D06P 1/18; D06P 3/54
[52] U.S. Cl. .................................. 534/650; 534/573; 534/581; 534/795
[58] Field of Search .................................. 534/795, 650

[56] References Cited

FOREIGN PATENT DOCUMENTS 55-133457 10/1980 Japan .................................. 534/795
59-213765 12/1984 Japan .................................. 534/650

*Primary Examiner*—Floyd D. Higel
*Attorney, Agent, or Firm*—Oblon, Fisher, Spivak, McClelland & Maier

[57] ABSTRACT

This invention relates to thiazoleazophenylaminoethyl carbonyloxy-$C_8$-$C_{10}$-alkyl compounds useful as dyes for polyester fibers represented by the formula:

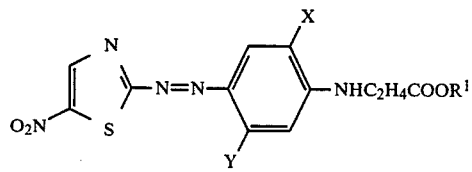

wherein X represents hydrogen, chlorine, methyl, methoxy or ethoxy; Y represents methyl, acetylamino or propionylamino; and $R^1$ represents $C_8$-$C_{10}$ alkyl.

5 Claims, No Drawings

THIAZOLEAZOPHENYLAMINOETHYL CARBONYLOXY-$C_8$-$C_{10}$-ALKYL COMPOUNDS USEFUL AS DYES FOR POLYESTER FIBERS

This application is a continuation of application Ser. No. 583,216, filed Feb. 24, 1984, now abandoned.

BACKGROUND OF THE INVENTION

1. Field of the Invention

This invention relates to monoazo dyestuffs for polyester fibers. More specifically, it relates to monoazo dyestuffs which dye polyester fibers in blue colors excellent in various fastness properties, in particular, light fastness, sublimation fastness, washing fastness, perspiration fastness and water fastness, and which are also excellent in heat resistance and alkali discharge printing properties.

2. Description of the Prior Art

Recently, an alkali discharge printing process has been increasingly frequently carried out as a new dyeing process for polyester fibers. The principle of the alkali discharge printing is to hydrolyze a dyestuff with alkali, thereby depriving it of its affinity to polyester fibers.

Therefore, the dyestuffs intended for that purpose contain carboxylate ester groups, hydroxyl groups etc. which have great hydrophilic properties and are easily reactive with alkali in their backbone structure. For that reason, they had a disadvantage that their moisture fastness, such as washing fastness, perspiration fastness, water fastness etc. and also heat resistance were poor. The present inventors have been intensively studying in order to develop blue dyestuffs having good alkali discharge printing properties and also having good moisture fastness and heat resistance, and finally have solved this antithetical contradiction in principle, thereby having accomplished this invention.

Although dyestuffs having structures analogous to those of this invention are known from Japanese Patent Application Laid-open No. 133457/1980, it is evident, as demonstrated by the comparison data in Table 1, that the dyestuffs of this invention are far more excellent in both moisture fastness and heat resistance as well as maintain good alkali discharge printing properties.

TABLE 1

| | Structural Formula | Alkali Discharge Printing Properties | Fastness after Polyurethane Finish | | | Heat Resistance |
|---|---|---|---|---|---|---|
| | | | Washing | Perspiration | Water | |
| Known Dyestuff 1 | $O_2N$-thiazole-$N=N$-phenyl($OC_2H_5$)($NHCOCH_3$)-$NHC_2H_4COOC_2H_5$ | Grade 4-5 | Grade 1-2 | 1-2 | 1-2 | 50 |
| Known Dyestuff 2 | $O_2N$-thiazole-$N=N$-phenyl(Cl)($NHCOCH_3$)-$NHC_2H_4COOC_2H_5$ | " | 2 | 2 | 2 | 55 |
| Known Dyestuff 3 | $O_2N$-thiazole-$N=N$-phenyl($CH_3$)($NHCOCH_3$)-$NHC_2H_4COOC_2H_5$ | " | " | " | " | 50 |
| Dyestuff of the Invention | $O_2N$-thiazole-$N=N$-phenyl($OC_2H_5$)($NHCOCH_3$)-$NHC_2H_4COOCH_2CHC_4H_9$ ($C_2H_5$) | " | 4-5 | 5 | 4-5 | 95 |
| Dyestuff of the Invention | $O_2N$-thiazole-$N=N$-phenyl(Cl)($NHCOCH_3$)-$NHC_2H_4COOCH_2CHC_4H_9$ ($C_2H_5$) | " | 5 | 5 | 5 | 95 |

TABLE 1-continued

| Structural Formula | Alkali Discharge Printing Properties | Fastness after Polyurethane Finish | | | Heat Resistance |
| --- | --- | --- | --- | --- | --- |
| | | Washing | Perspiration | Water | |
| Dyestuff of the Invention 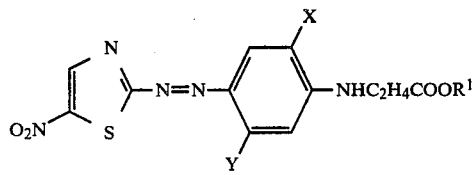 | " | 4–5 | 5 | 4–5 | 95 |

Notes:
(1) Known Dyestuff 1, Known Dyestuff 2, and Known Dyestuff 3
All described in Japanese Patent Application Laid-open No. 133457/1980.
(2) Alkali discharge printing properties
A dyed cloth previously dyed with the particular dyestuff was coated with a discharge printing paste containing sodium carbonate and polyethylene glycol (average molecular weight: 400), treated with superheated steam at a temperature of 180° C. for 7 minutes, then reducingly washed, and the whiteness of the discharged part of the obtained dyed cloth was judged using a gray scale for staining.
(3) Polyurethane finishing method
Curing was conducted using a 1% solution of Hydran F-24 K at 160° C. for 2 minutes.
(4) Washing fastness
A multi-fiber was attached to a dyed, polyurethane-finished cloth, and a washing test was conducted according to AATCC Method, Washing No. IIA; the staining of the nylon fiber of the multi-fiber was judged by a gray scale.
(5) Perspiration fastness
A dyed, polyurethane-finished cloth was tested according to JIS L-0848 Method A, using a nylon cloth and a silk cloth as attached cloths, and the degree of staining of the silk cloth was judged by a gray scale.
(6) Water fastness
A dyed, polyurethane-finished cloth was tested according to JIS L-0846 Method A, except that the attached nylon cloth was replaced by a silk cloth, and the degree of staining of the silk cloth was judged by a gray scale.
(7) Heat resistance
A dyestuff cake was mixed with a naphthalenesulfonic acid-formaldehyde condensate, and heat treated at 130° C. for an hour; the percent of the remaining dyestuff after heat treatment was determined to judge the heat resistance.

Percent of the Remaining Dyestuff = $\frac{\text{OD of the Dyestuff after Heat Treatment}}{\text{OD of the Non-treated Dyestuff}} \times 100$

SUMMARY OF THE INVENTION

Accordingly, this invention provides monoazo dyestuffs for polyester fibers which are of the formula [I]:

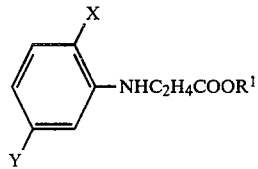

wherein X represents hydrogen, chlorine, methyl, alkoxy or alkoxyalkoxy, Y represents hydrogen, methyl, methoxy, chlorine or acylamino, and $R^1$ represents $C_6$–$C_{13}$ alkyl, $C_6$–$C_{13}$ alkoxyethyl, $C_6$–$C_{13}$ alkoxyethoxyethyl or benzyloxyethyl.

DETAILED DESCRIPTION OF THE INVENTION

The dyestuffs of the formula [I] above may be produced by diazotizing 2-amino-5-nitrothiazole and coupling it with an aniline of the formula [II]:

[II]

wherein X, Y and $R^1$ are as defined above.

The $C_6$–$C_{13}$ alkyl, $C_6$–$C_{13}$ alkoxyethyl and $C_6$–$C_{13}$ alkoxyethoxyethyl represented by $R^1$ may be either straight-chain or branched-chain. Examples of the alkoxy represented by X include methoxy, ethoxy, propoxy, butoxy etc.; examples of the alkoxyalkoxy include methoxyethoxy, ethoxyethoxy, butoxyethoxy etc.; and examples of the acylamino represented by Y include acetylamino, $C_6$–$C_{13}$ alkylcarbonylamino, chloroacetylamino, benzoylamino, ethoxycarbonylamino, ethylcarbonylamino, methylsulfonylamino, chloropropionylamino etc.

Examples of fibers which can be dyed with the monoazo dyestuffs of this invention include polyester fibers composed of e.g. polyethylene terephthalate, a polycondensate of terephthalic acid and 1,4-bis-(hydroxymethyl)cyclohexane, etc., and also mixed yarns and mixed woven fabrics of natural fibers such as cotton, silk, wool etc. with the above-described polyester fibers.

Dyeing of a polyester fiber with the dyestuff of this invention may be achieved in the conventional manner, for example, by dispersing the dyestuff of the formula [I] above in an aqueous medium using a dispersing agent such as a condensate of naphthalenesulfonic acid and formaldehyde, a higher alcohol sulfuric acid ester, a higher alkylbenzenesulfonic acid salt etc. to prepare a dyeing bath or printing paste, and conducting dip dyeing or print dyeing. For example, where dip dyeing is conducted, by applying a conventional dyeing process, e.g. high temperature process, carrier process, thermosol process etc., polyester fibers or their mixed spun or mixed woven products can be dyed in colors excellent in fastness properties. In addition, even better results may sometimes be obtained by adding an acidic substance such as formic acid, acetic acid, phosphoric acid, ammonium sulfate etc. to the dyeing bath.

The monoazo dyestuffs of this invention may also be used in combination with dyestuffs of the same type or those of other type, in particular, a combination of the dyestuffs of the formula [I] above with each other sometimes gives improved results, such as enhancement of dyeing properties, etc.

This invention is more particularly described by the following examples.

EXAMPLE 1

A 0.5 g amount of a monoazo dyestuff of the formula:

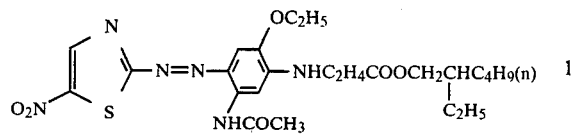

was dispersed in 3 l of water containing 1.0 g of naphthalene-sulfonic acid-formaldehyde condensate and 2 g of a higher alcohol sulfuric acid ester to prepare a dyeing bath. 100 g of a polyester cloth was dipped in this dyeing bath, and dyed at 130° C. for 60 minutes followed by soaping, washing with water and drying to obtain a yellow dyed polyester cloth having good light fastness, sublimation fastness and moisture fastness.

The dyestuff used in this example was prepared by dissolving 7.56 g of 3-N-2-ethylhexyloxycarbonylethyl-4-ethoxyacetanilide in 100 ml of methanol, adding dropwise thereto a diazo solution obtained by diazotizing 2.9 g of 5-nitro-2-aminonitrothiazole in sulfuric acid using nitrosil sulfuric acid, filtering out the separated precipitates, washing with water and drying (60% of the theoretical yield).

The λmax (acetone) of this product was 624 nm.

EXAMPLE 2

A 0.5 g amount of a dyestuff of the formula:

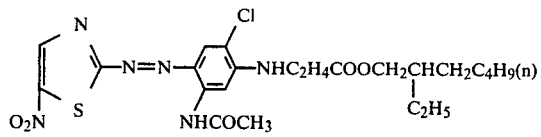

was mixed with 0.5 g of a naphthalenesulfonic acid-formaldehyde condensate, and pulverized on a paint shaker to obtain a finely particulated dyestuff. This was then adequately mixed with a basal paste having the following composition:

Carboxymethyl cellulose type sizing agent: 30 g
Tartaric acid: 0.2 g
Aromatic carrier: 0.3 g
Water: 69.5 g to obtain 100 g of a printing color paste.

A polyester fiber was print dyed with this printing color paste, provisionally dried at 100° C., then maintained in superheated steam at 170° C. for 7 minutes to develop a color, soaped, washed with water and dried to obtain a reddish blue dyed polyester cloth having good light fastness, sublimation fastness and moisture fastness.

The λmax (acetone) of this dyestuff was 565 nm.

EXAMPLE 3

Polyester fibers were dyed using the dyestuffs set forth in the following table 2 by procedures similar to those in Example 1 to obtain dyed products having hues shown in Table 2.

TABLE 2

Structural Formula

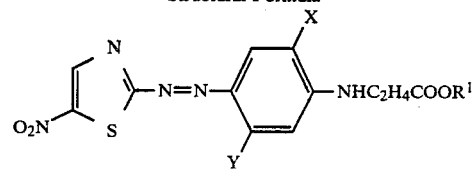

| No. | —X | —Y | —R¹ | Hue (polyester) | λmax (acetone) nm |
|---|---|---|---|---|---|
| 1 | —OCH$_3$ | —NHCOCH$_3$ | —CH$_2$CH(C$_2$H$_5$)C$_4$H$_9$(n) | Greenish Blue | 624 |
| 2 | " | " | —C$_6$H$_{13}$(n) | Greenish Blue | " |
| 3 | " | " | —C$_8$H$_{17}$(n) | Greenish Blue | " |
| 4 | " | " | —C$_9$H$_{19}$(n) | Greenish Blue | " |
| 5 | " | " | —C$_{10}$H$_{21}$(n) | Greenish Blue | " |
| 6 | " | " | —C$_{12}$H$_{25}$(n) | Greenish Blue | " |
| 7 | " | " | —C$_{13}$H$_{27}$(n) | Greenish Blue | " |
| 8 | —OC$_2$H$_5$ | " | —C$_8$H$_{17}$(n) | Greenish Blue | " |
| 9 | " | " | —C$_9$H$_{19}$(n) | Greenish Blue | " |
| 10 | " | " | —C$_{10}$H$_{21}$(n) | Greenish Blue | " |
| 11 | " | " | —C$_{12}$H$_{25}$(n) | Greenish Blue | " |
| 12 | " | " | —C$_{13}$H$_{27}$(n) | Greenish Blue | " |
| 13 | " | —NHCOC$_2$H$_5$ | —CH$_2$CH(C$_2$H$_5$)C$_4$H$_9$(n) | Greenish Blue | " |

TABLE 2-continued

Structural Formula

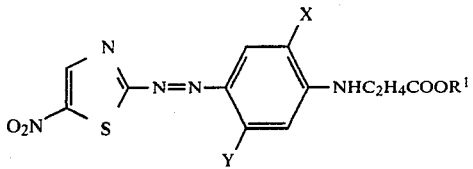

| No. | —X | —Y | —R¹ | Hue (polyester) | λmax (acetone) nm |
|---|---|---|---|---|---|
| 14 | " | —NHCOCH₃ | —C₂H₄OCH₂—⌬ | Greenish Blue | 621 |
| 15 | —OCH₃ | " | " | Greenish Blue | " |
| 16 | " | " | —C₂H₄OC₆H₁₃(n) | Greenish Blue | 623 |
| 17 | " | " | —C₂H₄OC₁₂H₂₅(n) | Greenish Blue | " |
| 18 | —OC₂H₅ | " | —C₂H₄OC₆H₁₃(n) | Greenish Blue | " |
| 19 | " | " | —C₂H₄OC₁₂H₂₅(n) | Greenish Blue | " |
| 20 | —OCH₃ | " | —C₂H₄OC₂H₄OC₆H₁₃(n) | Greenish Blue | " |
| 21 | " | " | —C₂H₄OC₂H₄OCH₂CH(C₂H₅)C₄H₉(n) | Greenish Blue | " |
| 22 | " | " | —C₂H₄OC₂H₄OC₁₂H₂₅(n) | Greenish Blue | " |
| 23 | —OC₂H₅ | " | —C₂H₄OC₂H₄OC₁₀H₂₁(n) | Greenish Blue | " |
| 24 | " | " | —C₂H₄OC₂H₄OC₆H₁₃(n) | Greenish Blue | " |
| 25 | " | " | —C₂H₄OC₂H₄OC₁₂H₂₅(n) | Greenish Blue | " |
| 26 | " | " | —C₂H₄OC₂H₄OC₁₃H₂₇(n) | Greenish Blue | " |
| 27 | —OC₂H₄OCH₃ | " | —CH₂CH(C₂H₅)C₄H₉(n) | Greenish Blue | " |
| 28 | " | —NHCOC₂H₅ | " | Greenish Blue | " |
| 29 | —OC₂H₅ | —NHCOCH₂CH(C₂H₅)C₄H₉(n) | " | Greenish Blue | " |
| 30 | —OC₂H₄OCH₃ | —NHCOCH₃ | —C₂H₄OCH₂—⌬ | Greenish Blue | 621 |
| 31 | —OC₂H₄OC₄H₉ | " | " | Greenish Blue | " |
| 32 | " | " | —CH₂CH(C₂H₅)C₄H₉(n) | Greenish Blue | 624 |
| 33 | " | " | —C₆H₁₃(n) | Greenish Blue | " |
| 34 | —Cl | " | " | Reddish Blue | 565 |
| 35 | " | " | —C₇H₁₅(n) | Reddish Blue | " |
| 36 | " | " | —C₈H₁₇(n) | Reddish Blue | " |
| 37 | " | " | —C₉H₁₉(n) | Reddish Blue | " |
| 38 | " | " | —C₁₀H₂₁(n) | Reddish Blue | " |
| 39 | " | " | —C₁₂H₂₅(n) | Reddish Blue | " |
| 40 | " | " | —C₁₃H₂₇(n) | Reddish Blue | " |
| 41 | " | " | —C₂H₄OCH₂—⌬ | Reddish Blue | 562 |

TABLE 2-continued

Structural Formula

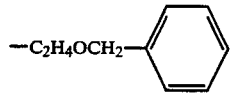

| No. | —X | —Y | —R¹ | Hue (polyester) | λmax (acetone) nm |
|---|---|---|---|---|---|
| 42 | " | " | —$C_2H_4OC_6H_{13}(n)$ | Reddish Blue | 564 |
| 43 | " | " | —$C_2H_4OC_{12}H_{25}(n)$ | Reddish Blue | " |
| 44 | " | " | —$C_2H_4OC_2H_4OC_6H_{13}(n)$ | Reddish Blue | " |
| 45 | " | " | —$C_2H_4OC_2H_4OC_{12}H_{25}(n)$ | Reddish Blue | " |
| 46 | " | —$NHCOC_2H_5$ | —$CH_2CH(C_2H_5)C_4H_9(n)$ | Reddish Blue | 565 |
| 47 | " | —$NHCOCH_2CH(C_2H_5)C_4H_9(n)$ | " | Reddish Blue | " |
| 48 | —$CH_3$ | —$NHCOCH_3$ | " | Blue | 587 |
| 49 | " | " | —$C_6H_{13}(n)$ | " | " |
| 50 | " | " | —$C_8H_{17}(n)$ | " | " |
| 51 | " | " | —$C_9H_{19}(n)$ | " | " |
| 52 | " | " | —$C_{10}H_{21}(n)$ | " | " |
| 53 | " | " | —$C_{11}H_{23}(n)$ | " | " |
| 54 | " | " | —$C_{12}H_{25}(n)$ | " | " |
| 55 | " | " | —$C_{13}H_{27}(n)$ | " | " |
| 56 | " | " | —$CH(CH_3)C_6H_{13}(n)$ | " | " |
| 57 | " | —$NHCOC_2H_5$ | —$CH_2CH(C_2H_5)C_4H_9(n)$ | " | " |
| 58 | " | —$NHCOCH_2CH(C_2H_5)C_4H_9$ | " | " | " |
| 59 | " | —$NHCOCH_3$ | —$C_2H_4OCH_2$—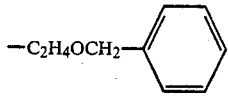 | " | 584 |
| 60 | " | " | —$C_2H_4OC_6H_{13}(n)$ | " | 586 |
| 61 | " | " | —$C_2H_4OC_{12}H_{25}(n)$ | " | " |
| 62 | " | " | —$C_2H_4OC_2H_4OC_6H_{13}(n)$ | " | " |
| 63 | " | " | —$C_2H_4OC_2H_4OC_{12}H_{25}(n)$ | " | " |
| 64 | —H | " | —$C_6H_{13}(n)$ | " | 583 |
| 65 | " | " | —$C_7H_{15}(n)$ | " | " |
| 66 | " | " | —$C_8H_{17}(n)$ | " | " |
| 67 | " | " | —$C_9H_{19}(n)$ | " | " |
| 68 | " | " | —$CH_2CH(C_2H_5)C_4H_9(n)$ | " | " |
| 69 | " | " | —$C_{10}H_{21}(n)$ | " | " |
| 70 | " | " | —$C_{12}H_{25}(n)$ | " | " |
| 71 | " | " | —$C_{13}H_{27}(n)$ | " | " |
| 72 | " | —$NHCOC_2H_5$ | —$CH_2CH(C_2H_5)C_4H_9(n)$ | " | " |
| 73 | " | —$NHCOCH_3$ | —$C_2H_4OCH_2$—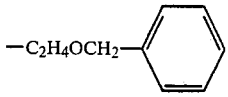 | Reddish Blue | 579 |
| 74 | " | " | —$C_2H_4OC_6H_{13}(n)$ | Blue | 582 |
| 75 | " | " | —$C_2H_4OC_{12}H_{25}(n)$ | " | " |
| 76 | " | " | —$C_2H_4OC_2H_4OC_6H_{13}(n)$ | " | " |
| 77 | " | " | —$C_2H_4OC_2H_4OC_{12}H_{25}(n)$ | " | " |
| 78 | —$OCH_3$ | —$CH_3$ | —$CH_2CH(C_2H_5)C_4H_9(n)$ | " | 615 |
| 79 | " | " | —$C_6H_{13}(n)$ | " | " |
| 80 | " | " | —$C_8H_{17}(n)$ | " | " |
| 81 | " | " | —$C_2H_4OCH_2$— | " | 612 |
| 82 | " | " | —$C_2H_4OC_6H_{13}(n)$ | " | 614 |
| 83 | " | " | —$C_2H_4OC_{12}H_{25}(n)$ | " | " |
| 84 | " | " | —$C_2H_4OC_2H_4OC_6H_{13}(n)$ | " | " |
| 85 | " | " | —$C_2H_4OC_2H_4OC_{12}H_{25}(n)$ | " | " |
| 86 | " | —$OCH_3$ | —$C_6H_{13}(n)$ | Greenish | 625 |

TABLE 2-continued

Structural Formula $$\text{O}_2\text{N}-\underset{\text{S}}{\overset{\text{N}}{\diagup\!\!\!\diagdown}}-\text{N}=\text{N}-\underset{Y}{\overset{X}{\diagup\!\!\!\!\diagdown}}-\text{NHC}_2\text{H}_4\text{COOR}^1$$

| No. | —X | —Y | —R$^1$ | Hue (polyester) | λmax (acetone) nm |
|---|---|---|---|---|---|
| 87 | " | " | —CH$_2$CH(C$_2$H$_5$)C$_4$H$_9$(n) | Blue Greenish Blue | " |
| 88 | " | " | —C$_2$H$_4$OCH$_2$—C$_6$H$_5$ | Greenish Blue | 622 |
| 89 | " | " | —C$_2$H$_4$OC$_6$H$_{13}$(n) | Greenish Blue | 624 |
| 90 | " | " | —C$_2$H$_4$OC$_{12}$H$_{25}$(n) | Greenish Blue | " |
| 91 | " | " | —C$_2$H$_4$OC$_2$H$_4$OC$_6$H$_{13}$(n) | Greenish Blue | " |
| 92 | " | " | —C$_2$H$_4$OC$_2$H$_4$OC$_{12}$H$_{25}$(n) | Greenish Blue | " |
| 93 | " | " | —C$_8$H$_{17}$(n) | Greenish | " |
| 94 | " | " | —C$_{10}$H$_{21}$(n) | Greenish Blue | " |
| 95 | —CH$_3$ | —CH$_3$ | —CH$_2$CH(C$_2$H$_5$)C$_4$H$_9$(n) | Reddish Blue | 587 |
| 96 | " | " | —C$_2$H$_4$OCH$_2$—C$_6$H$_5$ | Reddish Blue | 584 |
| 97 | " | " | —C$_2$H$_4$OC$_6$H$_{13}$(n) | Reddish Blue | 586 |
| 98 | " | " | —C$_2$H$_4$OC$_{12}$H$_{25}$(n) | Reddish Blue | " |
| 99 | " | " | —C$_2$H$_4$OC$_2$H$_4$OC$_6$H$_{13}$(n) | Reddish Blue | " |
| 100 | —H | " | —CH$_2$CH(C$_2$H$_5$)C$_4$H$_9$(n) | Reddish Blue | 582 |
| 101 | " | " | —C$_2$H$_4$OCH$_2$—C$_6$H$_5$ | Reddish Blue | 579 |
| 102 | " | " | —C$_2$H$_4$OC$_6$H$_{13}$(n) | Reddish Blue | 581 |
| 103 | " | " | —C$_8$H$_{17}$(n) | Reddish Blue | 582 |
| 104 | " | " | —C$_2$H$_4$OC$_{12}$H$_{25}$(n) | Reddish Blue | 581 |
| 105 | " | —NHCO—C$_6$H$_5$ | —CH$_2$CH(C$_2$H$_5$)C$_4$H$_9$(n) | Blue | " |
| 106 | " | " | —C$_2$H$_4$OCH$_2$—C$_6$H$_5$ | Reddish Blue | 577 |
| 107 | " | " | —C$_6$H$_{13}$(n) | Blue | 581 |
| 108 | " | —NHSO$_2$CH$_3$ | " | Reddish Blue | 577 |
| 109 | " | " | —CH$_2$CH(C$_2$H$_5$)C$_4$H$_9$(n) | Reddish Blue | " |

TABLE 2-continued

Structural Formula

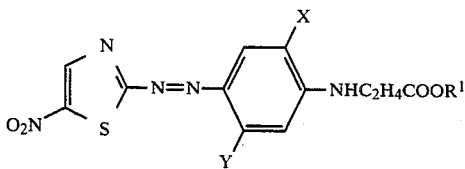

| No. | —X | —Y | —R¹ | Hue (polyester) | λmax (acetone) nm |
|---|---|---|---|---|---|
| 110 | " | —NHCOC$_2$H$_4$Cl | " | Blue | 583 |
| 111 | " | —NHCOCH$_2$Cl | " | " | 581 |
| 112 | " | —NHCOOC$_2$H$_5$ | " | Reddish Blue | 576 |
| 113 | " | —NHCONHC$_2$H$_5$ | " | Blue | 583 |
| 114 | " | —H | " | Reddish Blue | 572 |
| 115 | " | " | —C$_{10}$H$_{21}$(n) | Reddish Blue | " |
| 116 | " | " | —C$_2$H$_4$OCH$_2$—C$_6$H$_5$ | Reddish Blue | 568 |
| 117 | " | " | —C$_2$H$_4$OC$_6$H$_{13}$(n) | Reddish Blue | 571 |
| 118 | " | " | —C$_2$H$_4$OC$_{12}$H$_{25}$(n) | Reddish Blue | " |
| 119 | " | —Cl | —CH$_2$CH(C$_2$H$_5$)C$_4$H$_9$(n) | Reddish Blue | 569 |
| 120 | " | " | —C$_6$H$_{13}$(n) | Reddish Blue | " |
| 121 | " | " | —C$_2$H$_4$OC$_6$H$_{13}$(n) | Reddish Blue | 568 |

What is claimed is:

1. A monoazo dyestuff of the formula:

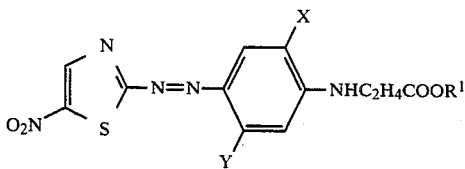

wherein X represents hydrogen, chlorine, methyl, methoxy or ethoxy; Y represents methyl, acetylamino or propionylamino; and R¹ represents C$_8$–C$_{10}$ alkyl.

2. The monoazo dyestuff of claim 1, wherein Y is acetylamino and X and R¹ are as defined in claim 1.

3. The monoazo dystuff of claim 1, wherein R¹ is C$_8$ alkyl and X and Y are as defined in claim 1.

4. A monoazo dyestuff of the formula:

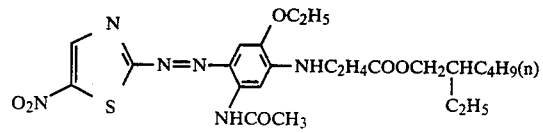

5. A monoazo dyestuff of the formula:

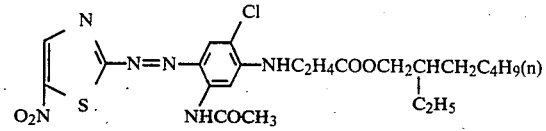

* * * * *